(12) United States Patent
Kekre et al.

(10) Patent No.: US 6,978,354 B1
(45) Date of Patent: Dec. 20, 2005

(54) METHOD FOR CREATING A VIRTUAL DATA COPY OF A VOLUME BEING RESTORED

(75) Inventors: Anand A. Kekre, Pune (IN); John A. Colgrove, Los Altos, CA (US); Oleg Kiselev, Palo Alto, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 508 days.

(21) Appl. No.: 10/327,536

(22) Filed: Dec. 20, 2002

(51) Int. Cl.$^7$ ............................................. G06F 12/00
(52) U.S. Cl. ........................ 711/162; 707/204; 711/114
(58) Field of Search ............................... 711/161, 162; 707/202

(56) References Cited

U.S. PATENT DOCUMENTS

| | | | | |
|---|---|---|---|---|
| 5,155,824 A | 10/1992 | Edenfield et al. | ........... | 395/425 |
| 5,497,483 A | 3/1996 | Beardsley et al. | ........... | 395/575 |
| 5,506,580 A | 4/1996 | Whiting et al. | ............... | 341/51 |
| 5,532,694 A | 7/1996 | Mayers et al. | ................. | 341/67 |
| 5,574,874 A | 11/1996 | Jones et al. | .................. | 395/376 |
| 5,649,152 A | 7/1997 | Ohran et al. | ................. | 395/441 |
| 5,778,395 A | 7/1998 | Whiting et al. | ............. | 707/204 |
| 5,835,953 A | 11/1998 | Ohran | ......................... | 711/162 |
| 5,907,672 A | 5/1999 | Matze et al. | ........... | 395/182.06 |
| 6,073,222 A | 6/2000 | Ohran | ......................... | 711/162 |
| 6,085,298 A | 7/2000 | Ohran | ......................... | 711/162 |
| 6,141,734 A | 10/2000 | Razdan et al. | ............... | 711/144 |
| 6,189,079 B1 | 2/2001 | Micka et al. | ................. | 711/162 |
| 6,269,431 B1 | 7/2001 | Dunham | ..................... | 711/162 |
| 6,282,610 B1 | 8/2001 | Bergsten | ..................... | 711/114 |
| 6,341,341 B1 | 1/2002 | Grummon et al. | .......... | 711/162 |
| 6,353,878 B1 | 3/2002 | Dunham | ..................... | 711/162 |
| 6,434,681 B1 | 8/2002 | Armangau | .................. | 711/162 |
| 6,460,054 B1 | 10/2002 | Grummon | .................. | 707/204 |
| 6,564,301 B1 | 5/2003 | Middleton | .................. | 711/144 |
| 6,591,351 B1 | 7/2003 | Urabe et al. | ................. | 711/162 |
| 6,785,789 B1 | 8/2004 | Kekre et al. | ................. | 711/162 |
| 6,792,518 B2 | 9/2004 | Armangau et al. | ......... | 711/162 |
| 2003/0041220 A1 | 2/2003 | Peleska | ....................... | 711/162 |
| 2003/0084242 A1 * | 5/2003 | Strange et al. | .............. | 711/114 |
| 2004/0002934 A1 * | 1/2004 | Taulbee et al. | ................ | 707/1 |
| 2005/0010733 A1 * | 1/2005 | Mimatsu et al. | ............ | 711/162 |

FOREIGN PATENT DOCUMENTS

| | | | | |
|---|---|---|---|---|
| EP | 0 332 210 A2 | 9/1989 | ........... | G06F 11/14 |
| EP | 0 566 966 A2 | 10/1993 | ........... | G06F 11/14 |
| EP | 1 091 283 A2 | 4/2001 | ............. | G06F 3/06 |

* cited by examiner

*Primary Examiner*—Mano Padmanabhan
*Assistant Examiner*—Paul Baker
(74) *Attorney, Agent, or Firm*—Campbell Stephenson Ascolese LLP

(57) ABSTRACT

In one embodiment of the method, first and second data volumes are created. Thereafter, a first data portion of the first data volume is overwritten with a first data portion of the second data volume. A second data portion of the first data volume is overwritten with a second data portion of the second data volume. In one embodiment, the first and second data portions of the first data volume are overwritten with the first and second data portions of the second data volume, respectively, in response to a command to restore or synchronize the data contents of the first data volume to the data contents of the second data volume. A virtual point-in-time (PIT) copy of the first data volume is created after overwriting the first data portion but before overwriting the second data portion.

22 Claims, 6 Drawing Sheets

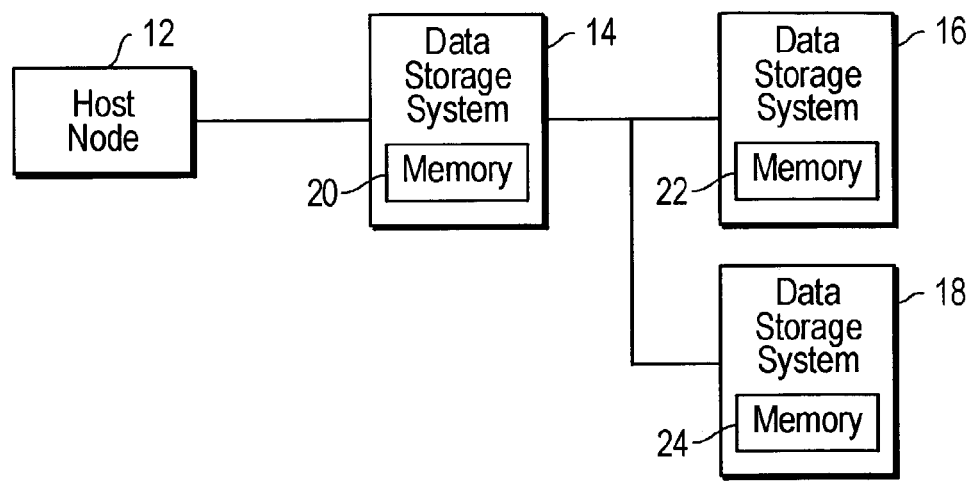
*FIG. 1*
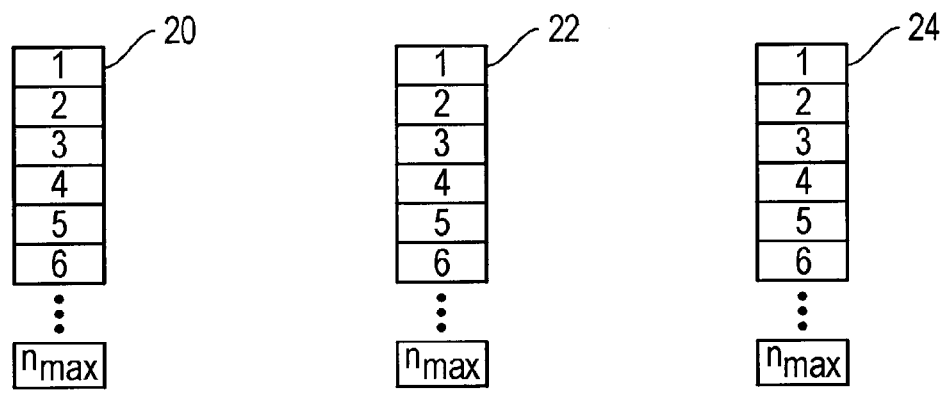
*FIG. 2*
*FIG. 3*

METHOD FOR CREATING A VIRTUAL DATA COPY OF A VOLUME BEING RESTORED

BACKGROUND OF THE INVENTION

Many businesses rely on large-scale data processing systems for storing and processing business data. FIG. 1 illustrates (in block diagram form) relevant components of a data processing system 10. Data processing system 10 and the description thereof should not be considered prior art to the invention described or claimed herein.

Data processing system 10 includes a host node 12 coupled to data storage systems 14–18. The term coupled should not be limited to what is shown within FIG. 1. Two devices (e.g., host node 12 and data storage system 14) may be coupled together directly or indirectly via a third device. Although data storage systems 14 and 16 appear to be coupled in series with host node 12, the present invention should not be limited thereto. Data storage systems 16 and 18 may be coupled in parallel with host node 12.

Data storage systems 14–18 include data memories 20–24, respectively. Alternatively, data memories 20–24 maybe included within a single data storage system. Each of the data memories 20–24 may take form in one or more dynamic or static random access memories, one or more arrays of magnetic or optical data storage disks, or combinations thereof. Data memories 20–24 should not be limited to the foregoing hardware components; rather, data memories 20–24 may take form in any hardware, software, or combination of hardware and software in which data may be persistently stored and accessed. Data memories 20–24 may take form in a complex construction of several hardware components operating under the direction of software. The data memories may take form in mirrored hardware. It is further noted that the present invention may find use with many types of redundancy/reliability systems. For example, the present invention may be used with Redundant Array of Independent Disks (RAID) systems. Moreover, the present invention should not be limited to use in connection with the host node of a data storage network. The present invention may find use in a storage switch or in any of many distinct appliances that can be used with a data storage system.

Data memory 20 stores data of a primary data volume. The primary data volume is the working volume of data processing system 10. Data memories 22 and 24 store or may be configured to store data of separate data volumes. For purposes of explanation, data memories 22 and 24 will be described as storing data of first and second data volumes, respectively. The first and second data volumes may be point-in-time (PIT) copies of the primary data volume or modified PIT (MPIT) copies of the primary data volume. A PIT copy, as its name implies, is a copy of the primary data volume created at some point-in-time. The first and second data volumes can be used to backup the primary data volume. The first and second data volumes can also be used to facilitate analysis of primary volume data without modifying data of the primary data volume.

As will be more fully described below, the first and second data volumes can be virtual or real. The first data volume is virtual when some data of the first data volume is stored in memory 20 (or 24). The first data volume is real when all data of the first data volume is stored in memory 22. Likewise, second data volume is virtual when some data of the second data volume is stored in memory 20 (or 22). The second data volume is real when all data of the second data volume is stored in memory 24. A virtual data volume can be converted to a real data volume via a background data copying process performed by host node 12. In the background copying process, for example, data of the first virtual volume is copied from memory 20 to memory 22 until all data of the first data volume is stored in memory 22.

FIG. 2 represents (in block diagram form) a logical structure of data memories 20–24. Each memory includes $n_{max}$ memory blocks into which data can be stored. Each memory block shown in FIG. 2 represents one to an arbitrarily large number of regions in physical memory that store data. The physical regions of a block need not be contiguous to each other. However, the physical regions are viewed as logically contiguous by a data management system executing on host node 12. Further, it is noted that any or all of the memories 20–24 may have more than $n_{max}$ memory blocks. For purposes of explanation, each block of data memory 20 stores data of the primary data volume. For purposes of explanation, $n_{max}$ memory blocks of memories 22 and 24 can be allocated by host node 12 for storing data of the first and second data volumes, respectively. Corresponding memory blocks in data memories 20–24 can be equal in size. Thus, memory block 1 of data memory 20 can be equal in size to memory block 1 of data memories 22 and 24. Each of the memory blocks within data memory 20 may be equal in size to each other. Alternatively, the memory blocks in data memory 20 may vary in size.

Host node 12 may take form in a computer system (e.g., a server computer system) that processes requests from client computer systems (not shown). To respond to the requests, host node 12 may be required to process data of the primary data volume. Host node 12 generates read or write-data transactions that access memory 20 in response to receiving requests from client computer systems. Host node 12 is also capable of accessing memory 22 or 24 through read or write-data transactions.

Host node 12 includes a data storage management system (not shown) that takes form in software instructions executing on one or more processors (not shown) within host node 12. The data management system may include a file system and a system for managing the distribution of data of a volume across several memory devices. Volume Manager™ provided by VERITAS Software Corporation of Mountain View, Calif. is an exemplary system for managing the distribution of volume data across memory devices. Volume and disk management products from product software companies also provide a system for managing the distribution of volume data across memory devices. Hardware RAID adapter cards and RAID firmware built into computer systems likewise provide this function.

The first and second volumes can be virtual PIT or MPIT copies of the primary data volume. Host node 12 can create a first virtual volume according to the methods described in copending U.S. patent application Ser. No. 10/143,059 entitled "Method and Apparatus for Creating a Virtual Data Copy" which is incorporated herein by reference in its entirety.

When host node 12 creates the first virtual volume, host node 12 creates a pair of valid/modified (VM) maps such as maps 30 and 32 represented in FIG. 3. Maps 30 and 32 correspond to memories 20 and 22, respectively. FIG. 3 also shows a VM map 34 which will be more fully described below. VM maps 30–34 may be persistently stored in memory of host node 12 or elsewhere. VM maps 30 and 32 include $n_{max}$ entries of two bits each in the embodiment shown. Each entry of VM map 30 corresponds to a respective block of memory 20, while each entry of VM map 32 corresponds to a respective block of data memory 22. In an alternative embodiment, each entry of VM map 30 may correspond to a respective group of blocks in memory 20, while each entry of VM map 32 may correspond to a respective group of blocks in memory 22.

The first and second bits in each entry are designated $V_n$ and $M_n$, respectively. $V_n$ in each entry, depending on its state, indicates whether its corresponding block n in memory contains valid data. For example, when set to logical 1, $V_2$ of VM map 30 indicates that block 2 of memory 20 contains valid primary volume data, and when set to logical 0, $V_2$ of VM map 30 indicates that block 2 of memory 20 contains no valid primary volume data. It is noted that when $V_n$ is set to logical 0, its corresponding memory block may contain data, but this data is not considered valid. $V_2$ of VM map 32, when set to logical 1, indicates that block 2 of memory 22 contains valid data of the first volume (e.g., the first virtual PIT copy). $V_2$ of VM map 32, when set to logical 0, indicates that block 2 of memory 22 does not contain valid data.

$M_n$ in each entry, depending on its state, indicates whether data within block n of the corresponding memory has been modified. For example, when set to logical 1, $M_3$ of VM map 30 indicates that block 3 of memory 20 contains data that was modified via a write-data transaction since creation of the first virtual volume. When set to logical 0, $M_3$ of VM 30 indicates that block 3 of memory 20 contains unmodified data. Likewise, $M_3$ in VM map 32, when set to logical 1, indicates that block 3 in memory 22 contains data that was modified via a write-data transaction since creation of the first virtual volume. When set to logical 0, $M_3$ of VM map 32 indicates that block 3 of memory 22 contains unmodified data.

When VM maps 30 and 32 are first created, each entry of VM map 32 is set to logical 0, thus indicating that memory 22 contains no valid or modified data. For purposes of explanation, it is presumed that each block of data memory 20 contains valid data of the primary volume. Accordingly, $V_n$ of each entry in VM 30 is initially set to logical 1. Lastly, $M_n$ of each entry in VM maps 30 and 32 is initially set to logical 0. Host node 12 can change the state of one or more bits in any map entry using single or separate I/O operations at the memory address that stores the map entry.

After VM maps 30 and 32 are initiated, host node 12 may run a background process to copy data of memory 20 to memory 22 in a block by block or blocks by blocks fashion. Eventually, this background process will transform the first virtual volume into a first real volume. However, before the background copying process is started or completed, host node 12 can modify data of the primary data volume or the first virtual volume.

FIG. 4 illustrates relevant operational aspects of modifying data of the primary data volume via a write-data transaction after creation of the first virtual PIT copy thereof. In FIG. 4, step 40, host node 12 generates a write-data transaction for modifying data in block n of memory 20. This write-data transaction can be generated in response to receiving a request from a client computer system. For the purposes of explanation, the phrase, "modifying data" includes writing new data. In response to generating the write-data transaction, host node 12 accesses VM map 32 to determine whether the data contents of block n in memory 20 has been copied to block n of data memory 22. More particularly, host node 12 accesses VM map 32 to determine whether $V_n$ is set to logical 1 as shown in step 42. Block n of memory 22 will contain valid data (i.e., $V_n$ of VM map 32 is set to logical 1) if the contents of block n in memory 20 were previously copied to block n of memory 22 by the background copying process mentioned above, or in response to a previous write-data transaction to modify data of block n in memory 20. If $V_n$ of VM map 32 is set to logical 0, then the process continues to step 44 where, as shown, host node 12 copies the contents of block n in memory 20 to block n in memory 22. Thereafter, in step 46, host node 12 sets $V_n$ of VM map 32 to logical 1. It is noted that the order of steps 44 and 46 can be reversed in an alternative embodiment. In this alternative embodiment, however, if a crash occurs after the step of setting $V_n$ in VM map 32 to logical 1 but before data of block n in memory 20 is copied to block n of memory 22, then VM map 32 may indicate that block n of data memory 22 contains valid data when, in fact, block n of memory 22 contains no data at all. Host node 12 may be configured to check for and correct such inconsistencies between VM map 32 and data memory 22 when host node 12 recovers from the crash. After step 46, host node 12 sets $M_n$ in VM map 30 to logical 1 as shown in step 50. Before the process ends, host node modifies data in block n of memory 20 in accordance with the write data transaction generated in step 40. It is noted that the order of steps 50 and 52 may be reversed in an alternative embodiment.

FIG. 5 shows the state of VM maps 30 and 32 of FIG. 3 after execution of two write-data transactions for modifying date of the primary data volume and after data is copied from the first two blocks of memory 20 to respective blocks of memory 22 via the background copying process. FIG. 5 shows that the first volume is still in the virtual state since one or more $V_n$ bits of map 32 are set to logical 0.

As noted above, before the background copying process begins or completes, the first virtual volume can be modified in accordance with write-data transactions generated by host node 12. FIG. 6 illustrates relevant operational aspects of modifying data of the first virtual volume via a write-data transaction. In FIG. 6, host node 12 generates a write-data transaction for modifying data of the first volume. Block n of memory 22 is the location where the data to be modified is stored or should be stored. In response to generating the write-data transaction, host node 12 accesses VM map 32 to determine whether block n of memory 22 contains valid data. If block n of memory 22 does not contain valid data, then $V_n$ of VM map 32 is set to logical 0 and the process proceeds to step 64 where host node 12 copies data of block n of memory 20 to block n of memory 22. Thereafter, in step 66 host node sets $V_n$ of VM map 32 to logical 1. It is noted that steps 64 and 66 can be reversed in order in an alternative embodiment. After $V_n$ is set to logical 1 or in response to host node determining in step 62, that $V_n$ is set to logical 1, host node sets $M_n$ of VM map 32 to logical 1 in step 70. Before the process in FIG. 6 ends, host node 12 modifies data in block n of memory 22 as shown in step 72. It is noted that in an alternative embodiment, steps 70 and 72 may be reversed.

FIG. 7 illustrates the state of VM maps 30 and 32 of FIG. 5 after execution of at least one write-data transaction for modifying data of the first virtual PIT copy. FIG. 7 shows that the first volume is in a virtual state since one or more $V_n$ bits of VM map 32 is set to logical 0.

The primary data volume can be restored or synchonized to the contents of the first volume in response to host node 12 receiving a restore command. The restore method includes overwriting data of block n in memory 20 with data of block n of memory 22 for each block n of memory 20 that contains data that differs from data in block n of memory 22. U.S. patent application Ser. No. 10/254,753 entitled "Method and Apparatus for Restoring a Corrupted Data Volume" which is incorporated herein by reference in its entirety illustrates one method for restoring a primary data volume to the contents of a virtual volume.

In one embodiment of the restore method, host node 12 adds a third bit $R_n$ to each entry and VM map 30. FIG. 7 shows VM map 30 with $R_n$ bits added thereto. The state of $R_n$ determines whether its corresponding block n in memory 20 is to be restored, i.e., overwritten with data of block n in memory 22. $R_n$ is initially set to logical 0 if $M_n$ in VM map 30 or 32 is set to logical 1, thus indicating that block n in memory 20 is to be overwritten with data of block n of memory 22. The state of $R_n$ is switched from logical 0 to logical 1 after data of block n of memory 20 is restored or overwritten with data of block n of memory 22. $R_n$ is initially set to logical 1 if $M_n$ in VM map 30 and 32 is set to logical 0, thus indicating that block n in memory 20 need not be overwritten with data of block n in memory 22. Host node 12 can access block n via read or write-data transactions after the state of $R_n$ is switched to logical 1. The restore method is nearly instantaneous in that host node 12 can access the primary data volume via read or a write-data transaction soon after a restore command is issued. In other words, host node 12 need not wait until the state of all $R_n$ bits are switched to logical 1.

Often, it is desirable to sequentially create new virtual PIT copies of the primary data volume during the day. Any one of these virtual PIT copies can be used to restore the primary volume should the primary volume experience data corruption. When the primary data volume is being restored to the contents of one of the virtual PIT copies, host node 12 may start to create a new virtual PIT copy in its schedule of creating virtual PIT copies. However, before host node 12 can create the new virtual PIT copy the process to restore the primary data volume to the contents of one of the virtual PIT copies, must complete (i.e., all $R_n$ bits of VM map 30 are set to logical 1). The operation to restore the primary data volume to the state of the virtual copy may take a substantial amount of time thus delaying the creation of the new virtual PIT copy of the primary volume.

SUMMARY OF THE INVENTION

Disclosed is an apparatus and method for creating a virtual data copy of a volume being restored. In one embodiment of the method, first and second data volumes are created. Thereafter, a first data portion of the first data volume is overwritten with a first data portion of the second data volume. A second data portion of the first data volume is overwritten with a second data portion of the second data volume. In one embodiment, the first and second data portions of the first data volume are overwritten with the first and second data portions of the second data volume, respectively, in response to a command to restore or synchronize the data contents of the first data volume to the data contents of the second data volume. A virtual point-in-time (PIT) copy of the first data volume is created after overwriting the first data portion but before overwriting the second data portion.

BRIEF DESCRIPTION OF THE DRAWINGS

The present invention may be better understood, and its numerous objects, features, and advantages made apparent to those skilled in the art by referencing the accompanying drawings.

FIG. 1 is a block diagram of a data processing system;
FIG. 2 shows block diagrams illustrating memory structure of data storage systems shown in FIG. 1;
FIG. 3 is a block diagram of VM maps created by the host node shown in FIG. 1.

The use of the same reference symbols in different drawings indicates similar or identical items.

DETAILED DESCRIPTION

The present invention relates to an apparatus and method of creating a virtual PIT copy of a data volume while the data volume is being restored. In one embodiment, the method is implemented as software instructions executing on one or more microprocessors.

Figure 4:
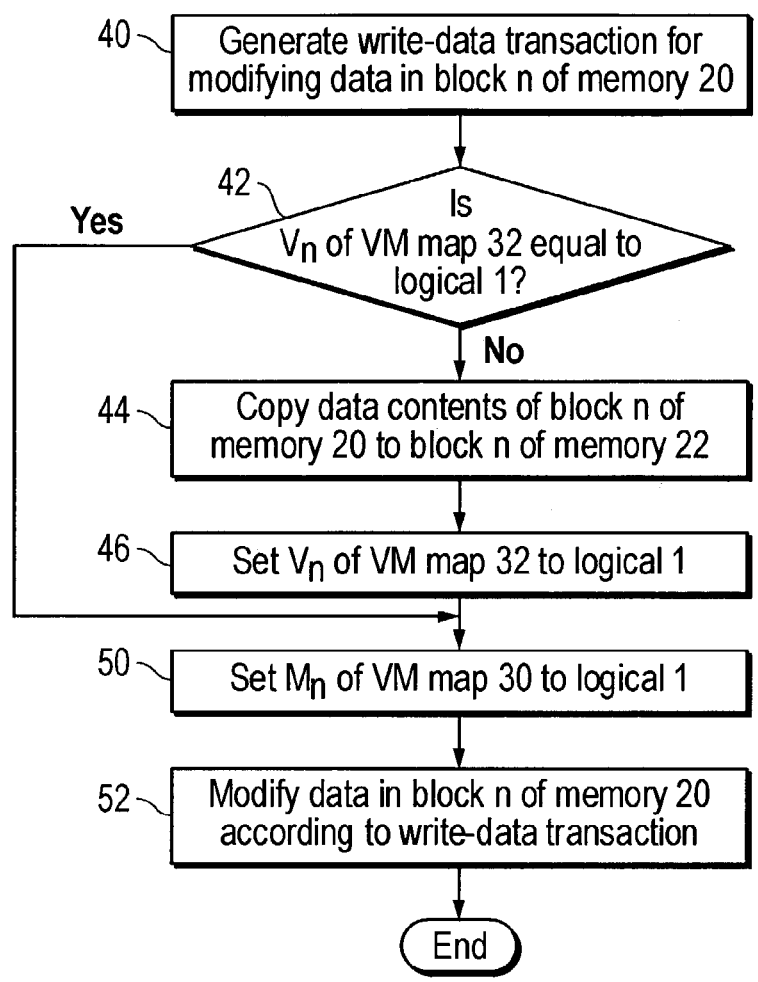
FIG. 4 is a flow chart illustrating operational aspects of writing or modifying data in the primary data volume.
Figure 5:
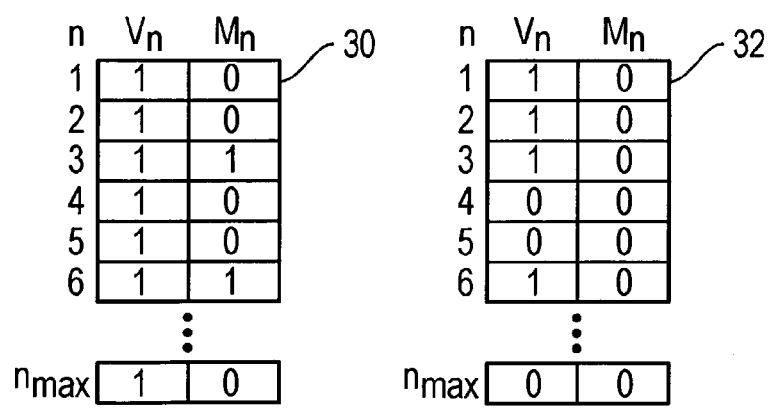
FIG. 5 is a block diagram of VM maps in FIG. 4 after modification thereof.
Figure 6:
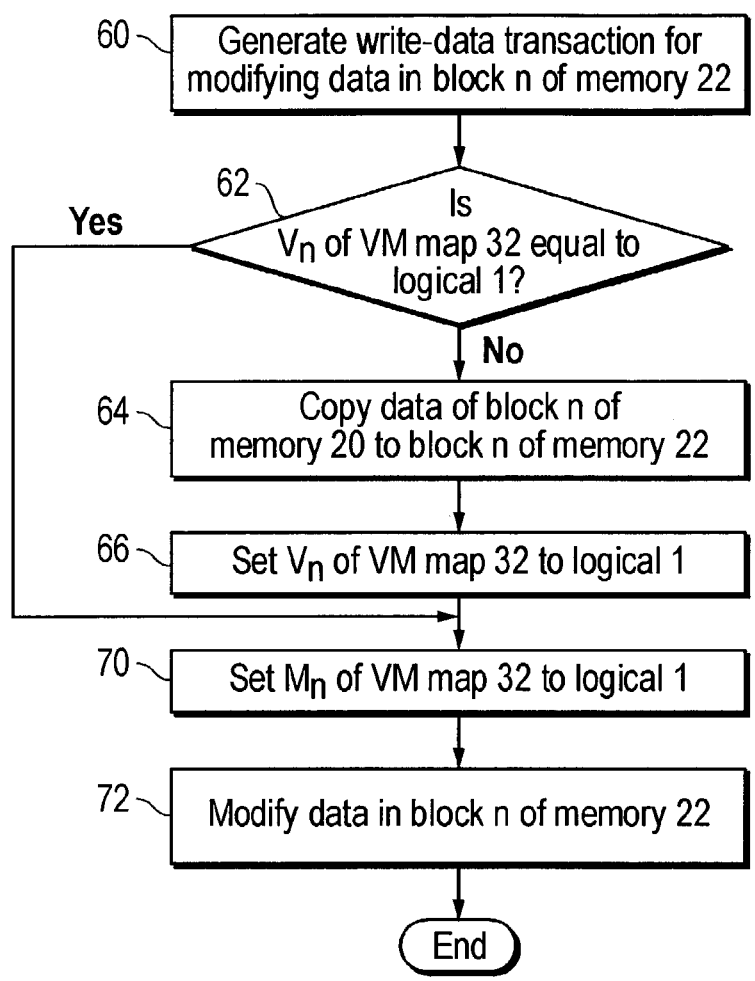
FIG. 6 is a flow chart illustrating operational aspects of the host node modifying data in a virtual data volume.
Figure 7:
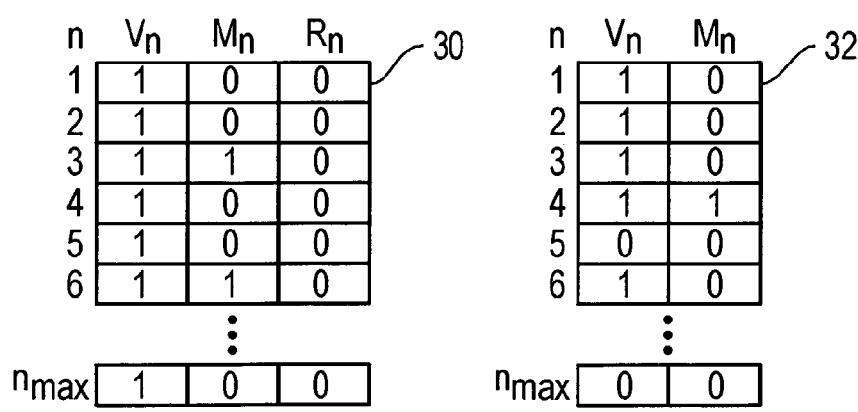
FIG. 7 is a block diagram of VM maps in FIG. 5 after modification thereof.
Figure 8:
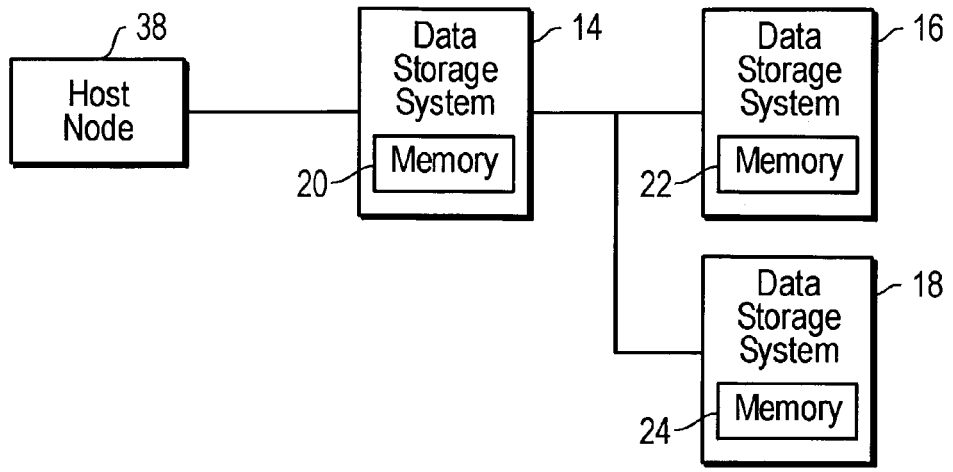
FIG. 8 is a block diagram of a data processing system employing one embodiment of the present invention.

FIG. 8 illustrates a data processing system employing one embodiment of the present invention. The data processing system of FIG. 8 is the same as the data processing system 10 of FIG. 1 except host node 12 is replaced by host node 38. Host node 38, like host node 12, is capable of restoring the primary data volume to the contents of the first virtual volume in response receiving a command. More particularly, when host 38 restores the primary data volume, host node 38 adds a third bit $R_n$ to each entry and VM map 30. The state of $R_n$ determines whether its corresponding block n in memory 20 is to be restored, i.e., overwritten with data of block n in memory 22. $R_n$ is initially set to logical 0 if $M_n$ in VM map 30 or 32 is set to logical 1, thus indicating that block n in memory 20 is to be overwritten with data of block n of memory 22. $R_n$ is initially set to logical 1 if $M_n$ in VM map 30 and 32 is set to logical 0, thus indicating that block n in memory 20 need not be overwritten with data of block n in memory 22. The state of $R_n$ is switched from logical 1 to logical 0 after data of block n of memory 20 is restored or overwritten with data of block n of memory 22. Host node 38 can access block n via read or write-data transactions after the state of $R_n$ is switched to logical 1. The restore method is nearly instantaneous in that host node 38 can access the primary data volume via read or a write-data transaction soon after a restore command is issued. In other words, host node 38 need not wait until the state of all $R_n$ bits is switched to logical 1.

Unlike host node 12, host node 38 is capable of creating a new virtual PIT copy of the primary data volume while the primary data volume is being restored (or before all $R_n$ bits of VM map 30 are set to logical 1) to the contents of the first virtual volume. Memory 24 can be configured to store data of the new virtual PIT copy. Host node 38 creates the new virtual PIT copy by creating VM map 34 shown in FIG. 3. Like VM maps 30 and 32, VM map 34 includes $n_{max}$ entries each corresponding to a respective block in memory 24. The $V_n$ bits of VM map 34 are initially set to logical 0, thus indicating that respective blocks in memory 24 initially contain no valid data. The $M_n$ bits of VM map 34 are also initially set to logical 0, indicating that respective blocks in memory 24 initially contain no modified data.

Figure 9:
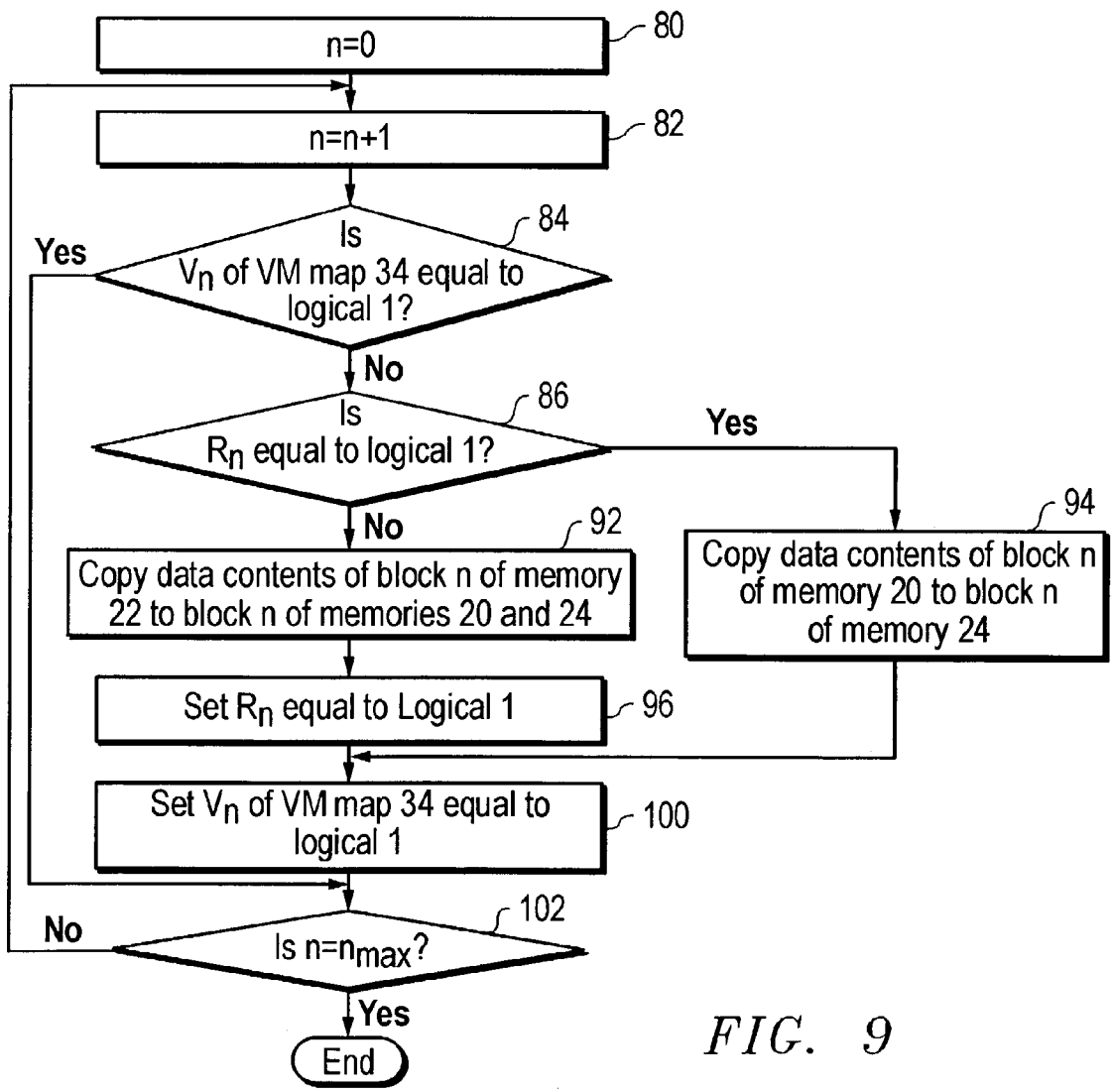
FIG. 9 is a flow chart illustrating operational aspects of converting a new virtual PIT of the primary data volume into a real PIT copy of the primary data volume.

The new virtual PIT copy can be converted into a real PIT copy of the primary data volume via host node 38 executing a background copying process. FIG. 9 illustrates relevant aspects of one embodiment of host node 38 running this background copying process. In FIG. 9, host node in step 80 initially sets variable n to 0. Thereafter in step 82, n is incremented by 1. In step 84, host node accesses VM map 34 to determine whether $V_n$ is set equal to logical 1 in step 84. If $V_n$ is set to logical 0, then in step 86 host node checks the value of $R_n$ in VM map 30. If $R_n$ is equal to logical 0, then block n of memory 20 is yet to be restored to the state of block n in memory 22 and the process proceeds to step 92 where host node 38 copies the data contents of block n of memory 22 to block n of memories 20 and 24. If $R_n$ is set to logical 1 in step 86, then in step 94 host node 38 copies the data contents of block n of memory 20 to block n of memory 24. After step 92, host node sets $R_n$ to logical 1 in step 96 thus indicating that block n in memory 20 has been restored. Thereafter, in step 100 host node sets $V_n$ of VM map 34 equal to logical 1. In step 102, host node 38 compares n to $n_{max}$. If the two are equal, the process ends. Otherwise, the process returns to step 82 where n is incremented by 1.

Figure 10:
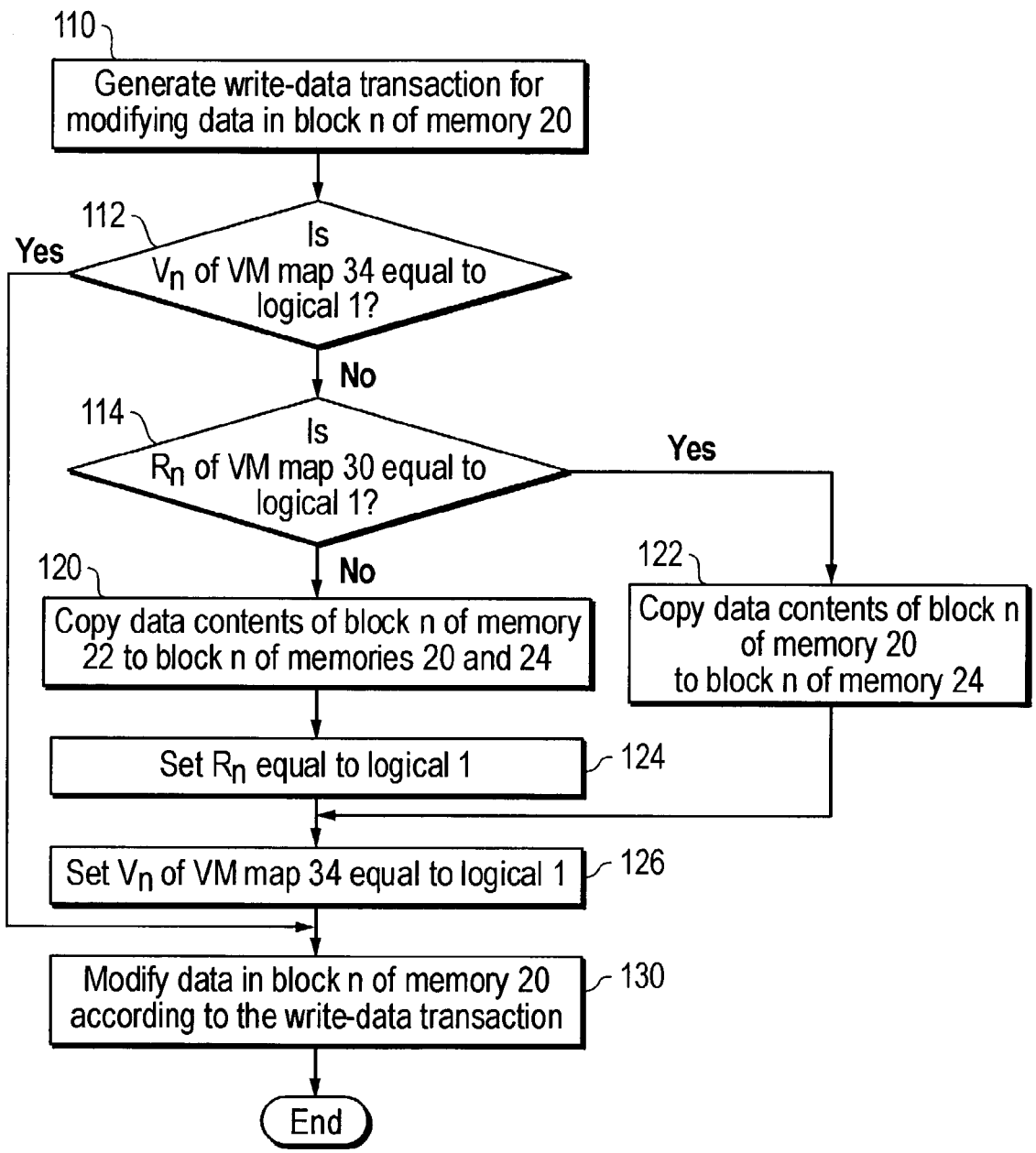
FIG. 10 is a flow chart illustrating operational aspects of modifying data in the primary data volume.

Before the conversion process illustrated in FIG. 9 starts or completes, host node 38 can update data in the primary data volume. FIG. 10 illustrates relevant aspects of host node 38 updating the primary data volume in response to a request received from a client computer system. More particularly, in step 110, host node 38 generates a write-data transaction for modifying data in block n of memory 20 in response to receiving a request from the client computer system. In response to step 110, host node 38 accesses VM map 34 to determine the state of $V_n$ thereof in step 112. If $V_n$ is set to logical 0, then host node accesses VM map 30 to determine the state of $R_n$ therein. If $R_n$ is set to logical 0, host node 38 copies the data contents of block n of memory 22 to block n of memories 20 and 24 in step 120. If $R_n$ is set to logical 1, then in step 122 host node 38 copies the contents of block n of memory 20 to block n of memory 24. After step 120 host node 38 sets $R_n$ in VM map 30 equal to logical 1 in step 124 thus indicating that block n in memory 20 has been restored. Thereafter, host node 38 sets $V_n$ in VM map 34 equal to logical 1 in step 126. Lastly, in step 126 or in response to host node 38 determining that $V_n$ in VM map 34 is equal to logical 1 in step 112, data in block n of memory 20 is modified according to the write-data transaction generated in step 110.

Figure 11:
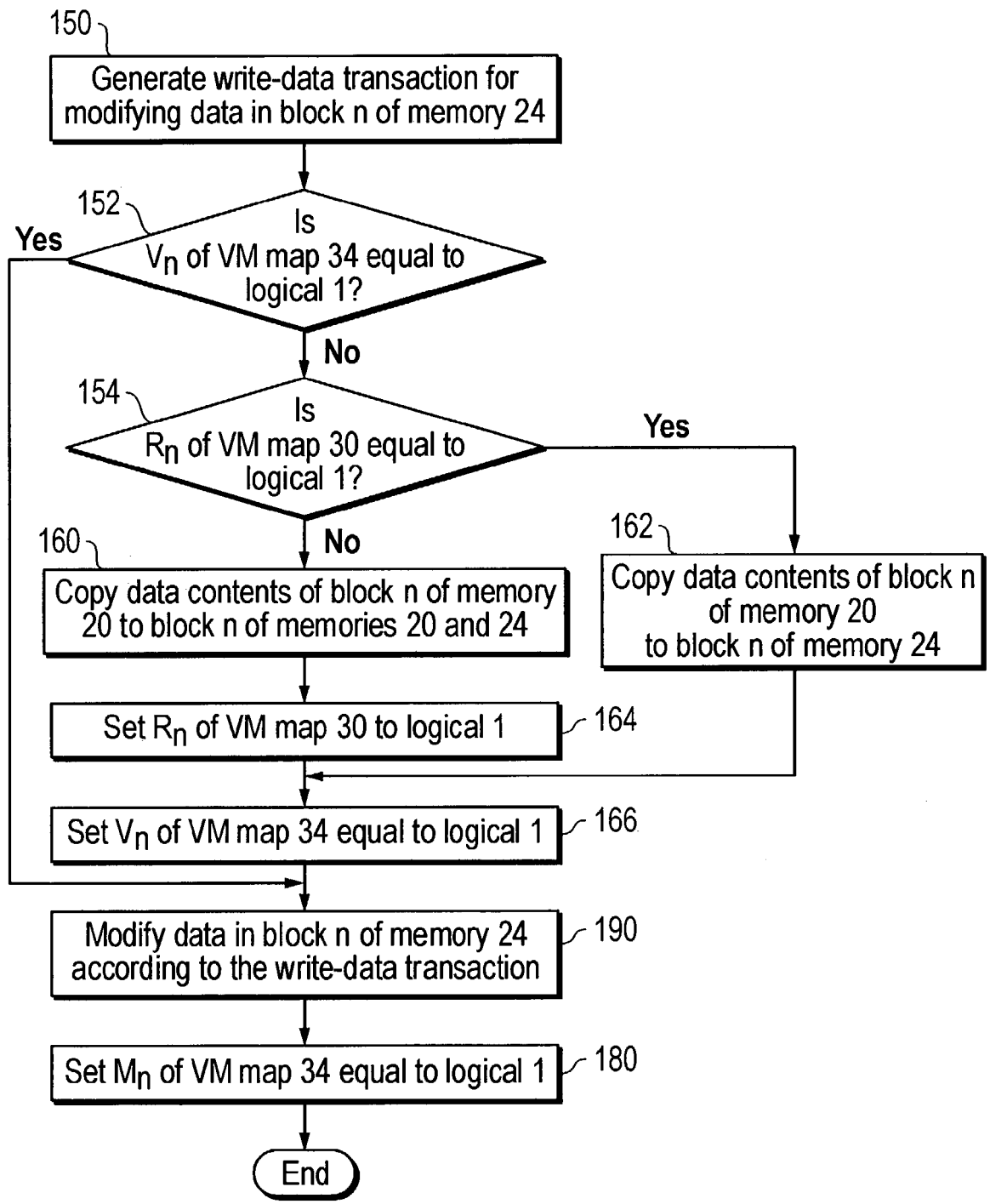
FIG. 11 is a flow chart illustrating operational aspects of modifying data in the new virtual PIT copy of the data volume.

In addition to the ability to modify the primary data volume before the new virtual PIT copy is converted into a real PIT copy of the primary data volume, host node 38 can modify data of the new virtual PIT copy thereby transforming the new virtual PIT copy into a virtual MPIT copy. FIG. 11 illustrates relevant aspects of one embodiment for modifying data of the new virtual PIT copy. The process shown in FIG. 11 is substantially similar to the process shown in FIG. 10. More particularly, in step 150, host node 38 generates a write-data transaction for modifying data in block n of memory 24. In response to step 152, host node 38 accesses VM map 34 to determine the state of $V_n$ thereof. If $V_n$ is set to logical 0, then in step 154 host node accesses VM map 30 to determine the state of $R_n$ therein. If $R_n$ is set to logical 0, host node 38 copies the data contents of block n of memory 22 to block n of memories 20 and 24 in step 160.

If $R_n$ is set to logical 1, then in step 162 host node 38 copies the contents of block n of memory 20 to block n of memory 24. In step 164 host node 38 sets $R_n$ in VM map 30 equal to logical 1 thus indicating that block n in memory 20 has been restored. Thereafter, host node 38 sets $V_n$ in VM map 34 equal to logical 1 in step 166. In step 180, host node 38 sets $M_n$ of VM map 34 to logical 1. Lastly, in step 180 data in block n of memory 20 is modified according to the write-data transaction generated in step 110.

Although the present invention has been described in connection with several embodiments, the invention is not intended to be limited to the embodiments described herein. On the contrary, it is intended to cover such alternatives, modifications, and equivalents as can be reasonably included within the scope of the invention as defined by the appended claims.

What is claimed is:

1. A method comprising:
    (a) creating a first data volume;
    (b) creating a second data volume;
    (c) overwriting a first data portion of the first data volume with a first data portion of the second data volume;
    (d) overwriting a second data portion of the first data volume with a second data portion of the second data volume;
    (e) creating a virtual point-in-time (PIT) copy of the first data volume, wherein (e) occurs after (c) but before (d).

2. The method of claim 1 further comprising:
    (f) modifying data of a third data portion of the first data volume after (c) but before (d).

3. The method of claim 1 further comprising:
    (f) modifying data of a third data portion of the first data volume, wherein (f) occurs after (c) but before (d), and wherein (e) occurs after (f).

4. The method of claim 3 further comprising:
    (g) allocating memory to store data of the virtual PIT copy;
    (h) copying the third data portion to the memory allocated in (g) before (f).

5. The method of claim 1 wherein (c) and (d) occur in response to generation of a command to synchronize the data contents of the first data volume to the data contents of the second data volume.

6. The method of claim 1 further comprising:
    (i) modifying data of the first and second data portions of the first data volume, wherein (i) occurs before (c) and (d);
    wherein the second data volume is created as virtual PIT copy of the first data volume in (b), and wherein (b) occurs before (i).

7. The method of claim 1 further comprising:
    (j) generating a write-data transaction for modifying data of the second data portion of the first data volume, wherein (j) occurs after (e) but before (d);
    (k) copying the first data portion of the second data volume to memory allocated to the virtual PIT copy, wherein (k) occurs after (j) but before (d).

8. A computer readable medium comprising instructions executable by a computer system, wherein the computer system implements a method in response to executing the instructions, the method comprising:
    (a) creating a first data volume;
    (b) creating a second data volume;
    (c) overwriting a first data portion of the first data volume with a first data portion of the second data volume;

(d) overwriting a second data portion of the first data volume with a second data portion of the second data volume;

(e) creating a virtual point-in-time (PIT) copy of the first data volume, wherein (e) occurs after (c) but before (d).

9. The computer readable medium of method of claim 8 wherein the method further comprises:

(f) modifying data of a third data portion of the first data volume after (c) but before (d).

10. The computer readable medium of method of claim 8 wherein the method further comprises:

(f) modifying data of a third data portion of the first data volume, wherein (f) occurs after (c) but before (d), and wherein (e) occurs after (f).

11. The computer readable medium of method of claim 10 wherein the method further comprises:

(g) allocating memory to store data of the virtual PIT copy;

(h) copying the third data portion to the memory allocated in (g) before (f).

12. The computer readable medium of claim 8 wherein (c) and (d) occur in response to generation of a command to synchronize the data contents of the first data volume to the data contents of the second data volume.

13. The computer readable medium of method of claim 8 wherein the method further comprises:

(i) modifying data of the first and second data portions of the first data volume, wherein (i) occurs before (c) and (d);

wherein the second data volume is created as a virtual PIT copy of the first data volume in (b), and wherein (b) occurs before (i).

14. The computer readable medium of method of claim 8 wherein the method further comprises:

(j) generating a write-data transaction for modifying data of the second data portion of the first data volume, wherein (j) occurs after (e) but before (d);

(k) copying the first data portion of the second data volume to memory allocated to the virtual PIT copy, wherein (k) occurs after (j) but before (d).

15. An apparatus comprising:

a primary memory for storing a primary data volume;

a computer system in data communication with the primary memory, the computer system comprising a computer readable medium for storing instructions executable by the computer system, wherein the computer system implements a method in response to executing the instructions, the method comprising:

(a) creating a primary data volume in the primary memory;

(b) creating a second data volume;

(c) overwriting a first data portion of the first data volume with a first data portion of the second data volume;

(d) overwriting a second data portion of the first data volume with a second data portion of the second data volume;

(e) creating a virtual point-in-time (PIT) copy of the first data volume, wherein (e) occurs after (c) but before (d).

16. The apparatus of claim 15 wherein the method further comprises:

(f) modifying data of a third data portion of the first data volume, wherein (f) occurs after (c) but before (d), and wherein (e) occurs after (f).

17. The apparatus of claim 16 wherein the method further comprises:

(g) allocating memory to store data of the virtual PIT copy;

(h) copying the third data portion to the memory allocated in (g) before (f).

18. The apparatus of claim 15 wherein (c) and (d) occur in response to generation of a command to synchronize the data contents of the first data volume to the data contents of the second data volume.

19. An apparatus comprising:

a primary memory for storing a primary data volume;

means for creating a primary data volume in the primary memory;

means for creating a second data volume;

means for overwriting a first data portion of the first data volume with a first data portion of the second data volume;

means overwriting a second data portion of the first data volume with a second data portion of the second data volume;

means creating a virtual point-in-time (PIT) copy of the first data volume, wherein the virtual PIT copy is created after overwriting the first data portion but before overwriting the second data portion.

20. The apparatus of claim 16 wherein the primary memory may take form in any one or more of magnetic disc, optical disc, solid state disc, non-volatile RAM including battery backed and flash memory.

21. A circuit comprising:

a first sub-circuit for creating first and second data volumes;

a second sub-circuit for overwriting a first data portion of the first data volume with a first data portion of the second data volume;

a third sub-circuit for overwriting a second data portion of the first data volume with a second data portion of the second data volume;

a fourth sub-circuit for creating a virtual point-in-time (PIT) copy of the first data volume, wherein the fourth sub-circuit creates the virtual PIT copy after the second sub-circuit overwrites the first data portion, and wherein the fourth sub-circuit creates the virtual PIT copy before the third sub-circuit overwrites the second data portion.

22. The computer readable medium of method of claim 8 wherein the method further comprises:

(i) modifying data of the first and second data portions of the first data volume, wherein (i) occurs before (c) and (d);

wherein the second data volume is created as a real PIT copy of the first data volume in (b), and wherein (b) occurs before (i).

* * * * *